E. E. GOLD.
HOSE COUPLING.
APPLICATION FILED FEB. 20, 1917.

1,312,625.

Patented Aug. 12, 1919.

WITNESSES:
René Pfuine
J. F. Wallace

INVENTOR:
Edward E. Gold
By Attorneys,
Fraser Tink & Myers

UNITED STATES PATENT OFFICE.

EDWARD E. GOLD, OF NEW YORK, N. Y., ASSIGNOR TO GOLD CAR HEATING & LIGHTING COMPANY, OF NEW YORK, N. Y., A CORPORATION OF NEW YORK.

HOSE-COUPLING.

1,312,625.     Specification of Letters Patent.     Patented Aug. 12, 1919.

Application filed February 20, 1917. Serial No. 149,726.

*To all whom it may concern:*

Be it known that I, EDWARD E. GOLD, a citizen of the United States of America, residing in the borough of Manhattan, city, county, and State of New York, have invented certain new and useful Improvements in Hose-Couplings, of which the following is a specification.

My invention relates to hose couplings, and is particularly designed with reference to its employment in couplers for connecting the end of hose used on railroad trains, such as steam hose. In hose of this character, owing to changes that have taken place in the equipment of the surface railroads, it has become of importance to provide means for securely and positively locking the couplers in coupling position. My invention, therefore, has for its object to produce a positive lock for the heads of steam hose. The invention consists in the employment of a locking member having a rounded locking end, such as a ball, which is mounted in a channel in an arm of the coupler and is adapted to be projected through the open end of this channel so as to engage behind a portion of the mating coupler when the heads are coupled and which is securely and positively held in such locking position by a screw bolt behind it. A desirable form in which my invention may be embodied is illustrated in the accompanying drawings, wherein—

My invention is illustrated as applied to a Gold coupler of the familiar direct port type. In this coupler two mating heads are employed which are the same in construction. Each head is provided with a body A having on one side a projection B and on the other side an arm C carrying a lug D. Each coupler head is so equipped and they are assembled by placing the ports together and by a downward swinging movement of the heads whereby the lug on each arm is adapted to engage behind the projection on the body of the mating coupler head when the heads are coupled together.

Figure 1:
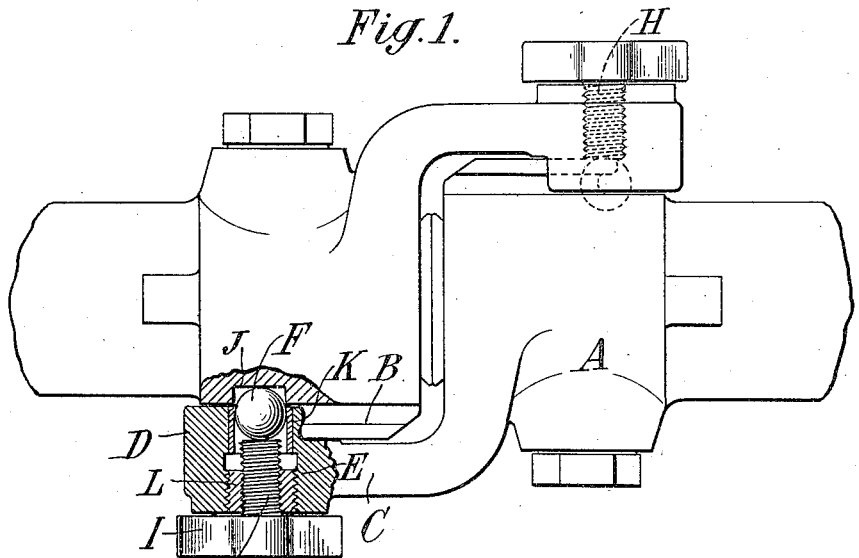
Figure 1 is a plan view, partly in section, of a pair of coupler heads containing my invention.
Figure 2:
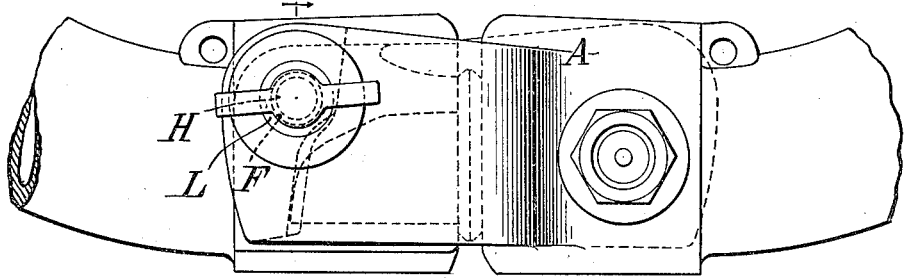
Fig. 2 is a side elevation thereof.
Figure 3:
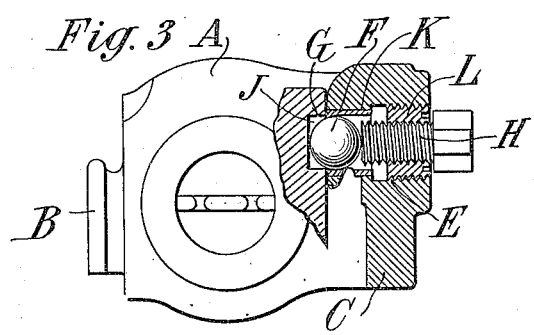
Fig. 3 is a cross-section on the line 3—3 Fig. 2.

My invention provides means for positively holding the said heads in such coupled position. In carrying my invention into effect I provide each arm C with a channel E in which is mounted a locking member F. This locking member has a portion adapted to project beyond the inner open end of the channel E, and a desirable construction is provided by restricting the inner end of the entrance to the said channel and by rounding the outer end of the locking member so as to restrain the locking member from passing out of the said channel. When the locking member is in its forward position it is adapted to engage behind a portion of the body of the mating coupler and prevent relative movement of the parts so long as the locking member remains in locking position. As the coupler heads are uncoupled by an upward movement of the arm C, as seen in Fig. 3, the locking member F is adapted to engage behind a shoulder G in the body of the mating coupler head. To constitute a positive lock means are provided for holding the said locking member F in locking position, and such means take the form of the bolt H which is threaded in the walls of the channels E and is adapted to press against the locking member F and to push the same to locking position and to securely hold it in such position.

The bolt H is provided with a stop to prevent it from pressing the locking member F too far forward as otherwise there would be a tendency for it to force the locking member out of the channel E when the couplers are uncoupled. Such means take the form of a head I on the said bolt which provides the means whereby the bolt may be turned and by engagement with the arm C prevents the bolt being turned too far inward.

Preferably the locking member F will be constructed in the form of a ball, and I prefer also to provide the body of the mating coupler head with a recess J upon the upper end of which the shoulder G is formed and in this recess the ball F is seated when the same is in position to lock the parts together.

Advantages in construction are provided by forming the channel E with a sleeve K on its inner end, which sleeve is of proper diameter to receive the ball F and is restricted at its inner end, as hereinabove described. For the same reasons I prefer to mount the screw-bolt H in a bushing L which is threaded on its outside to screw the same into the coupler arm C and on its inner side to receive the bolt H.

It will be obvious from the foregoing description that I have provided a simple, strong and efficient positive lock for hose couplers and that the same has no parts liable to get out of order or become lost, for the reason that it has no parts which are required to be removed therefrom in order to uncouple the couplers. Further, that the couplers may be locked by tools which are in the possession of every train man, all that is necessary for this purpose being a hammer which will lock the couplers in position by a few taps on the head I.

I have illustrated and described the most desirable form of my invention now known to me, but modifications may be made therein within the limits of the appended claims.

What I claim is:—

1. Locking means for direct port couplers of the type described wherein each of a pair of mating coupler heads has a projection, a body and an arm carrying a lug adapted to engage said projection when the heads are coupled, comprising a locking member mounted in a channel in an arm so as to project therefrom in position to engage behind a portion of the mating coupler when the heads are coupled, and a bolt in said channel adapted to adjust said locking member to locking position and to maintain it in such position, and a head on said bolt adapted to engage against said arm and prevent the locking member being forced out of the channel.

2. In a direct port coupler, comprising mating coupler heads each having a body with a projecting on a side thereof and an arm with a lug thereon, the respective lugs adapted to engage behind the respective projections when the heads are coupled, means for positively locking said heads in coupled position, comprising a ball mounted in a channel in said arm, and a screw bolt for adjusting said ball to locking position and for holding it in such position, the arm having a threaded bushing engaged by said screw bolt.

3. In a direct port coupler, comprising mating coupler heads each having a body with a projection on a side thereof and an arm with a lug thereon, the respective lugs adapted to engage behind the respective projections when the heads are coupled, means for positively locking said heads in coupled position, comprising a ball mounted in a channel in said arm, said channel having a restricted opening on its inner end, permitting the projection of said ball to locking position but restraining its passage out of the channel, the mating coupler having a locking recess adapted to receive said ball when the mating heads are coupled, and a screw-bolt in said channel adapted to adjust said ball to locking position and to maintain it in such position, said screw-bolt having a head by which the same may be turned and which comprises a stop for said bolt and prevents it forcing the ball out of the channel when the couplers are uncoupled.

In witness whereof, I have hereunto signed my name in the presence of two subscribing witnesses.

EDWARD E. GOLD.

Witnesses:
HARRY C. POILLON,
F. W. DEARBORN.